United States Patent
Dubeyko et al.

(10) Patent No.: US 10,013,346 B2
(45) Date of Patent: Jul. 3, 2018

(54) METHOD OF DECREASING WRITE AMPLIFICATION OF NAND FLASH USING A JOURNAL APPROACH

(71) Applicant: HGST Netherlands B.V., Amsterdam (NL)

(72) Inventors: Viacheslav Anatolyevich Dubeyko, San Jose, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/943,841

(22) Filed: Nov. 17, 2015

(65) Prior Publication Data

US 2017/0139822 A1    May 18, 2017

(51) Int. Cl.
*G06F 12/02* (2006.01)
*G06F 12/122* (2016.01)

(52) U.S. Cl.
CPC ........ *G06F 12/0246* (2013.01); *G06F 12/122* (2013.01); *G06F 2212/69* (2013.01); *G06F 2212/7208* (2013.01)

(58) Field of Classification Search
CPC .. G06F 3/0643; G06F 3/0644; G06F 12/0246; G06F 2212/7202; G06F 17/30091; G06F 17/30185; G06F 17/30218
See application file for complete search history.

(56) References Cited

U.S. PATENT DOCUMENTS

| | | | |
|---|---|---|---|
| 8,612,719 B2 | 12/2013 | Givargis et al. | |
| 8,856,469 B2 | 10/2014 | Jin et al. | |
| 9,460,008 B1 | 10/2016 | Leshinsky et al. | |
| 2006/0085493 A1* | 4/2006 | Kim | G06F 3/0608 |
| 2008/0068894 A1 | 3/2008 | Lohse et al. | |
| 2010/0241790 A1* | 9/2010 | Whang | G06F 12/0246 711/103 |
| 2014/0101115 A1* | 4/2014 | Ko | G06F 17/30129 707/692 |
| 2015/0149692 A1* | 5/2015 | Wang | G06F 12/0253 711/103 |
| 2016/0344834 A1 | 11/2016 | Das | |
| 2017/0139616 A1 | 5/2017 | Dubeyko et al. | |
| 2017/0139825 A1 | 5/2017 | Dubeyko et al. | |

\* cited by examiner

*Primary Examiner* — Edward J Dudek, Jr.
*Assistant Examiner* — Andrew Russell
(74) *Attorney, Agent, or Firm* — McDermott Will & Emery LLP

(57) ABSTRACT

A journaling approach is used to distribute data of different sizes between areas of a segment's log on a physical NAND flash erase block. The Main area contains large, contiguous extents of data, and the Journal area contains logical blocks of small data. An Updates area also contains updates that are pending. One disclosed embodiment includes storing a first file fragment associated with a file in a journal area of a log, where a size of the file fragment is less than a physical NAND flash page size limit, receiving a second file fragment associated with the file, combining the first file fragment and the second file fragment when a combined size of the fragments is equal to the physical NAND flash page size limit, storing the combined fragments in a main area of a second log, receiving an update associated with the combined fragments, and storing the update in an updates area of a third log.

18 Claims, 4 Drawing Sheets

METHOD OF DECREASING WRITE AMPLIFICATION OF NAND FLASH USING A JOURNAL APPROACH

CROSS REFERENCE TO RELATED APPLICATION

This application claims the benefit of the co-pending, commonly-owned U.S. patent application Ser. No. 14/943,941, filed on Nov. 17, 2015, by Dubeyko, et al., and titled "METHOD OF IMPROVING GARBAGE COLLECTION EFFICIENCY OF FLASH-ORIENTED FILE SYSTEMS USING A JOURNALING APPROACH", and hereby incorporated by reference in its entirety.

This application claims the benefit of the co-pending, commonly-owned U.S. patent application Ser. No. 14/944,043, filed on Nov. 17, 2015, by Dubeyko, et al., and titled "METHOD OF DECREASING WRITE AMPLIFICATION FACTOR AND OVER-PROVISIONING OF NAND FLASH BY MEANS OF DIFF-ON-WRITE APPROACH", and hereby incorporated by reference in its entirety.

FIELD

Embodiments of the present invention generally relate to data storage systems. More specifically, embodiments of the present invention relate to systems and methods for reducing write amplification of flash-oriented file systems.

BACKGROUND

Many flash-oriented file systems employ a log-structured scheme for writing data on file system volumes. Once data has been written to a NAND flash block, an entire NAND flash block must be erased before a NAND flash page can be rewritten. As such, a copy-on-write policy is applied to any update of information already on the volume, where data is rewritten to a new NAND flash block. However, copy-on-write policy greatly affects write amplification for most solid state drives (SSDs). All SSDs have a write amplification value based on what is currently being written and what was previously written to the SSD. Several factors contribute to write amplification, including techniques used to mitigate read and write disturbances and wear-leveling policies, where user data is regularly moved from aged segments into clean segments. Garbage collection policies further increase write amplification.

Different techniques have been used to decrease write amplification in SSDs. TRIM commands may be issued by an operating system to handle sectors containing invalid data. SSDs that receive TRIM commands can consume the sectors containing invalid data as free space when the NAND flash blocks containing these NAND flash pages are erased instead of copying the invalid data to clean NAND flash pages. Another technique for reducing write amplification includes separating static and dynamic data on the SSD. In general, write amplification is reduced (and SSD performance is increased) when data compression and de-duplication is used to reduce redundant data. However, none of the above-mentioned techniques completely solve the write amplification issues associated with flash-based file systems. What is needed is an approach that significantly reduces write amplification of flash-based file systems without negatively impacting the performance of these systems.

SUMMARY

Methods and systems for managing data storage in flash memory devices are described herein. Embodiments of the present invention utilize a journal approach in NAND flash erase blocks to reduce write amplification and improve performance of flash memory devices, such as SSDs.

According to one embodiment, a method of storing file fragments of growing files in a flash-based storage system to reduce write amplification is disclosed. The method includes storing a first file fragment associated with a file in a journal area of a log, where a size of the file fragment is less than a physical NAND flash page size limit, receiving a second file fragment associated with the file, combining the first file fragment and the second file fragment when a combined size of the fragments is equal to the physical NAND flash page size limit, storing the combined fragments in a main area of a second log, receiving an update associated with the combined fragments, and storing the update in an updates area of a third log.

According to another embodiment, an apparatus for storing file fragments of growing files in a flash-based storage system to reduce write amplification is disclosed. The apparatus includes a flash memory device, a main memory, and a processor communicatively coupled to the flash memory device and the main memory that stores a first file fragment associated with a file in a journal area of a log, where a size of the file fragment is less than a physical NAND flash page size limit, receives a second file fragment associated with the file, combines the first file fragment and the second file fragment when a combined size of the fragments is equal to the physical NAND flash page size limit, stores the combined fragments in a main area of a second log, receives an update associated with the combined fragments, and stores the update in an updates area of a third log.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
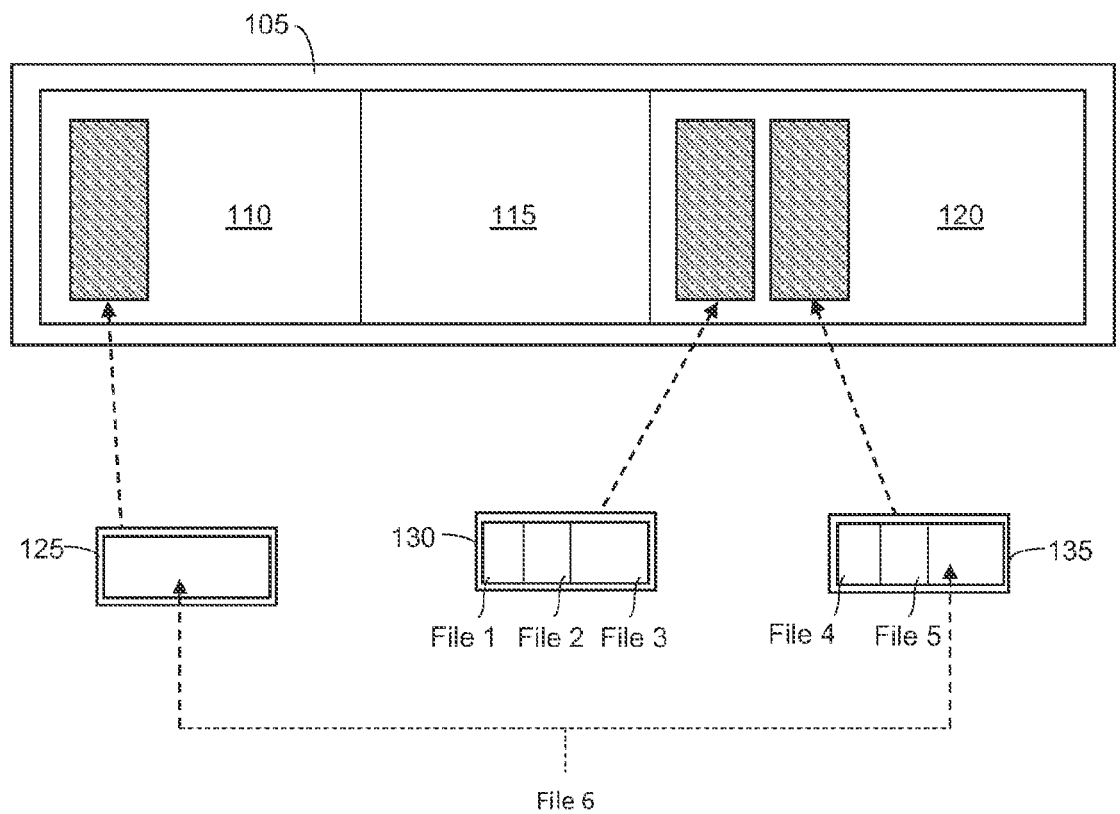
FIG. 1 depicts an exemplary segment's log having a Main area, a Journal area, and an Updates area for storing file segments according to embodiments of the present invention.
Figure 1:
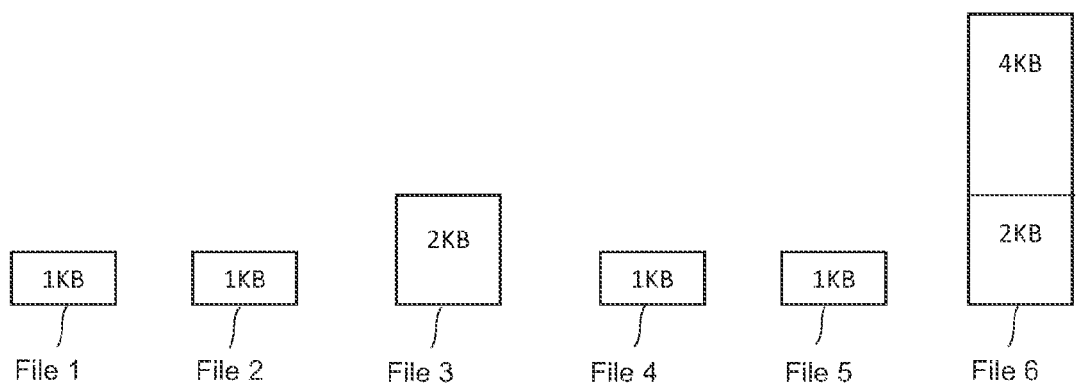

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart (e.g., FIG. 3) of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

METHOD OF DECREASING WRITE AMPLIFICATION OF NAND FLASH USING A JOURNAL APPROACH

The following description is presented to enable a person skilled in the art to make and use the embodiments of this invention; it is presented in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

A log-structured file system divides the file system's volume into chunks called segments. The segments have a fixed size and are a basic item for allocating free space on the file system volume. Each segment comprises one or more NAND flash blocks (e.g., erase blocks) using a stack model. User data is saved on the volume as a log, which is a segment-based portions of user data combined with metadata. Each erase block includes one or more logs. A log is conceptually divided into a "Main" area, an "Updates" area, and a "Journal" area. The Main area contains large, contiguous extents of data. The Journal area contains logical blocks of small files or small fragments of different files. The Updates area contains block updates that are pending.

With regard to FIG. 1, an exemplary log 105 comprising Main area 110, Update area 115, and Journal area 120 is depicted according to embodiments of the present invention. Main area 110 comprises data with a low probability of containing invalid logical blocks. Possible sources of logical block invalidation in Main area 110 is data truncation operation. Main area 110 may be considered the most important area for garbage collection activity. Updated data of logical blocks stored in a main area of a different log are stored in Updates area 115. Updates Area 115 also comprises data with a low probability of containing invalid logical blocks. The Updates area may store updates of logical blocks of main areas of different logs, and very frequent updates may be placed in a page cache before flushing data onto a volume. When enough data is written to fill an entire NAND flash page, then the data is moved from an update area to a main area (e.g., Main area 110). Subsequent updates to this logical block will be stored in an updates area of a different log. Updates Area 115 helps prevent fragmentation of data extents in the Main Area, thus reducing write amplification and improving performance. According to some embodiments, data stored in a logical block of a log will cannot be stored in multiple areas of the same log at the same time (e.g., Main area 110 and Updates area 115).

Referring still to FIG. 1, exemplary Files 1-6 stored in a flash-base file system are depicted according to embodiments of the present invention. File 1, 2, 4, and 5 comprise 1 KB each, File 3 comprises 2 KB, and File 6 contains a 4 KB portion and a 2 KB portion. According to the embodiment depicted in FIG. 1, each physical NAND flash page may comprise a maximum of 4 KB. File 1 (1 KB), File 2 (1 KB), and File 3 (2 KB) are joined in a first 4 KB NAND flash page and stored in Journal area 120. File 4 (1 KB), File 5 (1 KB) and a 2 KB portion of File 6 are joined and stored in a second NAND flash page of Journal area 120. The other portion of File 6 is 4 KB (equal to size of physical NAND flash page) and is stored in Main area 110.

Figure 2:
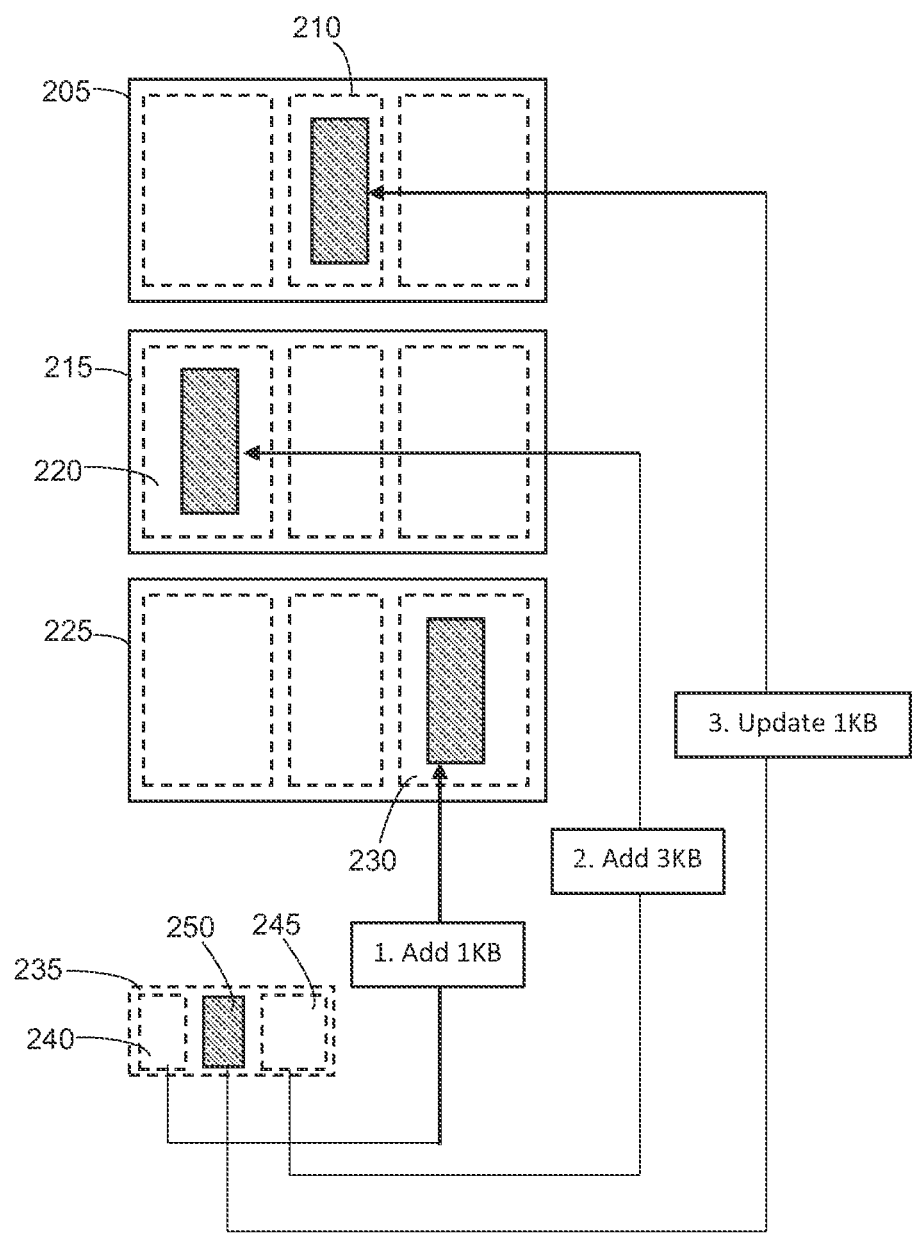
FIG. 2 depicts exemplary segments logs 205, 215, and 225 used to store fragments of a growing file according to embodiments of the present invention.

With regard to FIG. 2, exemplary segment logs 205, 215, and 225 of a of an exemplary file system are depicted according to embodiments of the present invention. In generally, roughly 61% of files on a given volume are smaller than 10 KB in size. See John R. Douceur and William J. Bolosky, "A Large-Scale Study of File-System Contents", SIGMETRICS '99 Proceedings of the 1999 ACM SIGMETRICS international conference on Measurement and modeling of computer systems, Pages 59-70, 1999, Nitin Agrawal, William J. Bolosky, John R. Douceur, Jacob R. Lorch, "A Five-Year Study of File-System Metadata", ACM Transactions on Storage (TOS), Volume 3 Issue 3, October 2007, and Yinjin Fu; Hong Jiang; Nong Xiao; Lei Tian; Fang Liu, "AA-Dedupe: An Application-Aware Source Deduplication Approach for Cloud Backup Services in the Personal Computing Environment," Cluster Computing (CLUSTER), 2011 IEEE International Conference on, vol., no., pp. 112, 120, 26-30 Sep. 2011, which are hereby incorporated by reference. This provides a powerful opportunity for reducing write amplification due to frequently writing and/or modifying such small files. For example, a journal area (e.g., Journal area 230) can be used to store a combination of several small fragments of different small files. When a file's content is larger than the physical NAND flash page size, a portion of the file can be stored in the Main area of a log, and the remainder of the file can be stored in the Journal area.

More specifically, embodiments of the present invention improve file system performance and decrease write amplification for flash-based devices using Journal and Updates areas in at least the following ways. A Journal area stores several small files in NAND flash pages. Several small files are compacted into one NAND flash page instead of several NAND flash pages for every small file which decreases the total amount of write operations, thereby decreasing the associated write amplification factor. Reading one NAND flash page of a Journal area means that several small files are read at once, thereby enhancing the performance of read operations. Also, if a Journal area includes valid data, then garbage collection will move several small files into one NAND flash page instead of moving several NAND flash pages for every file, thereby improving read and write performance and decreasing write amplification.

An Updates area may be used for storing compressed updated blocks of a Main area. One NAND flash page may comprise several compressed updated blocks of the Main area. This decreases the total amount of write operations, thereby decreases the associated write amplification factor. A read operation on the NAND flash device is performed faster than a write operation, and a garbage collection activity will read a data extent from the Main area, read compressed updates from Updates area, apply updates on a data extent in DRAM (main memory), and garbage collection will write the data extent into a Main area of a different log. This decreases write the associated amplification factor and improves performance of garbage collection operations.

A Journal area includes several small files into one NAND flash page, and when files grow in size, they may be re-packed and stored in a Journal or Main area of another log or logs. NAND flash pages are invalidated in a Journal area of the previous log. Again, Updates area includes updated blocks of a Main area. If some file is updated frequently, the previous state in the Updates area of the previous log is invalidated and the new state is stored into the Updates area of another log.

Still with regard to FIG. 2, a file 235 comprising a 1 KB portion 240, a 3 KB portion 245, and a 1 KB update 250 is written to the flash-based storage system. Portion 240 of file 235 is less than the physical NAND flash page size and is written to Journal area 230 of log 225. Every NAND flash page of Journal area 230 is used for storing several small fragments of small files. Subsequently, 3 KB portion 245 of file 235 is added, bringing the total file size to 4 KB. Because the file is now equal to the physical NAND flash page size, the portion are joined and written to a pre-allocated NAND flash page of Main area 220. Subsequently, 1 KB update 250 for the file is received and written to Updates area 210 of log 205.

Figure 3:
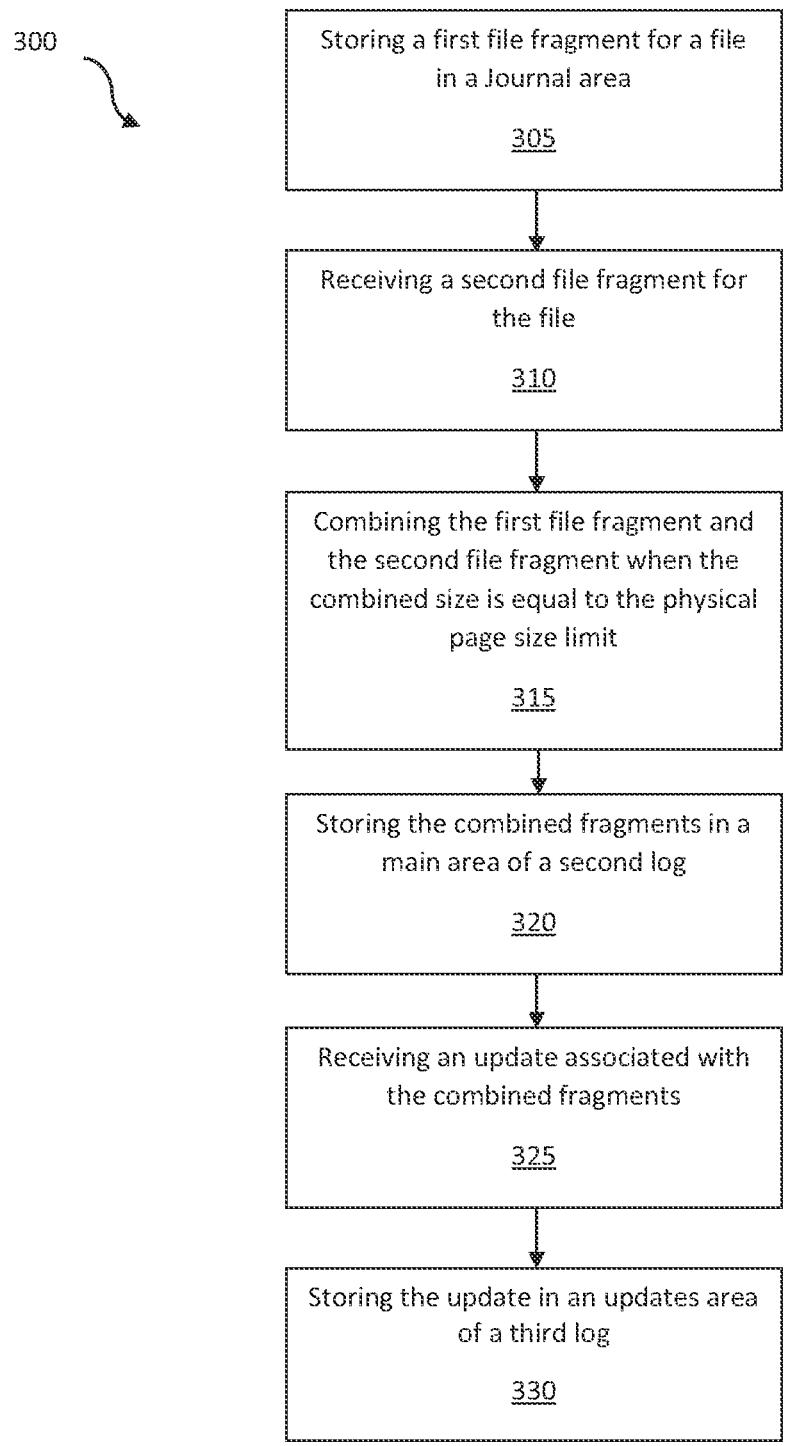
FIG. 3 depicts an exemplary computer-implemented process for storing file fragments of growing files in a flash-based storage system according to embodiments of the present invention.

With regard to FIG. 3, an exemplary computer-implemented process 300 for storing file fragments of growing files in a flash-based storage system is depicted according to embodiments of the present invention. At step 305, a first file fragment of a file is stored in a journal area of a first log. At step 310, a second file fragment of the file is received for storage. At step 315, the first file fragment and the second file fragment are combined and the total combined size is equal to a physical NAND flash page size limit (e.g., 4 KB). At step 320, the combined fragments are stored in a main area of a second log. According to some embodiments, the combined fragments are stored in a pre-allocated NAND flash page of the main area of the second log. At step 325, a pending update for the file is received. At step 330, the update is stored in an updates area of a third log and the process ends.

Figure 4:
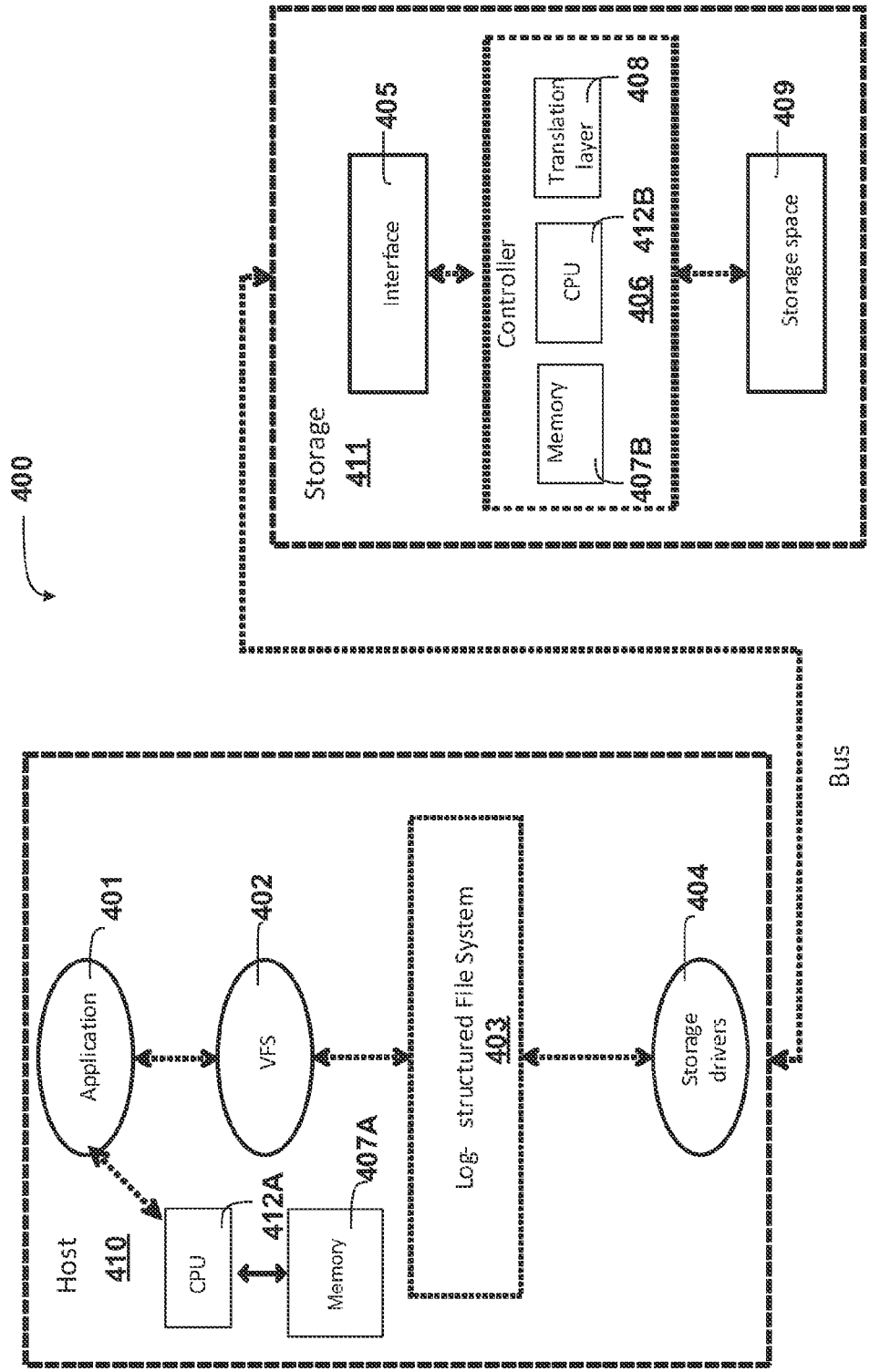
FIG. 4 depicts an exemplary computer system for managing a data storage system using a journal approach to reduce write amplification according to embodiments of the present invention.

FIG. 4 illustrates an exemplary computer system 400 for managing a data storage system using a journal approach to reduce write amplification. Host 410 is communicatively coupled to Storage 411 using a data bus, for example. Application 401 running on Host 410 is a user-space application and may comprise any software capable of initiating requests for storing or retrieving data from a persistent storage device. Application 401 communicates with Virtual File System Switch (VFS) 402, a common kernel-space interface that defines what file system will be used for requests from user-space applications (e.g., application 401). Log-structured file system 403 is maintained on Host 410 for storing data using storage drivers 404. Storage drivers 404 may comprise a kernel-space driver that converts requests of a file system or block layer into commands, and data packets for an interface that is used for low-level interaction with a storage device (e.g., storage 411). Memory 407A comprises DRAM and stores volatile data. The DRAM is used to construct segments' logs to be written to storage space 409.

Storage 411 comprises an interface for enabling low-level interactions (physically and/or logically) with storage device 411. For example, the interface may utilize SATA, SAS, NVMe, etc. Usually, an interface is defined according to a specification that strictly defines physical connections, available commands, etc. Storage 411 further comprises a controller 406 optionally having a memory 2407B and a translation layer 408. In the case of SSDs, the translation layer may comprise a FTL (Flash Translation Layer). Typically an FTL is on the SSD-side, but it can also be implemented on the host side. The goals of FTL are: (1) map logical numbers of NAND flash blocks into physical ones; (2) garbage collection; and (3) implementing wear-leveling. Data is written to and read from storage space 409 using controller 406. According to some embodiments, System 400 further comprises CPU 412A and/or CPU 412B. CPU 412A of Host 410 performs Diff-On-Write operations for writing data to storage space 409 using controller 406.

Embodiments of the present invention are thus described. While the present invention has been described in particular embodiments, it should be appreciated that the present invention should not be construed as limited by such embodiments, but rather construed according to the following claims.

What is claimed is:

1. A method of storing file fragments of growing files in a flash-based storage system, comprising:
    storing a first file fragment associated with a file in a journal area of a first log in flash memory, wherein a size of the file fragment is less than a physical NAND flash page size limit;
    receiving a second file fragment associated with the file;
    combining the first file fragment and the second file fragment when a combined sized of the fragments is equal to the physical NAND flash page size limit;
    storing the combined fragments in a main area of a second log in flash memory, wherein the second log is different from the first log;
    receiving an update associated with the combined fragments; and storing the update in an updates area of a third log in flash memory, wherein the third log is different from the first and second logs, wherein each of the first, second and third logs comprises a respective journal area, a respective main area and a respective updates area.

2. The method of claim 1, wherein a size of the update is less than the physical NAND flash page size limit.

3. The method of claim 1, wherein the main area comprises content that is rarely updated, and the updates area and the journal area comprise content that is frequently updated.

4. The method of claim 1, wherein the flash-based storage system comprises NAND flash.

5. The method of claim 1, wherein the combined fragments are stored in a pre-allocated NAND flash page of the main area.

6. The method of claim 1, further comprising updating metadata information associated with the first, second, and third logs.

7. An apparatus for storing file fragments of growing files in a flash-based storage system, comprising:
a flash memory device;
a main memory; and
a processor communicatively coupled to the flash memory device and the main memory, the processor configured to:
store a first file fragment associated with a file in a journal area of a first log in the flash memory device, wherein a size of the file fragment is less than a physical NAND flash page size limit;
receive a second file fragment associated with the file;
combine the first file fragment and the second file fragment when a combined size of the fragments is equal to the physical NAND flash page size limit;
store the combined fragments in a main area of a second log in the flash memory device, wherein the second log is different from the first log;
receive an update associated with the combined fragments; and
store the update in an updates area of a third log in the flash memory device, wherein the third log is different from the first and second logs,
wherein each of the first, second and third logs comprises a respective journal area, a respective main area and a respective updates area.

8. The apparatus of claim 7, wherein the first, second, and third logs are constructed in the main memory and stored on the flash memory device.

9. The apparatus of claim 7, wherein a size of the update is less than the physical NAND flash page size limit.

10. The apparatus of claim 7, wherein the main area comprises content that is rarely updated, and the updates area and the journal area comprise content that is frequently updated.

11. The apparatus of claim 7, wherein the flash-based storage system comprises NAND flash.

12. The apparatus of claim 7, wherein the combined fragments are stored in a pre-allocated NAND flash page of the main area.

13. A computer program product tangibly embodied in a computer-readable storage device and comprising instructions that when executed by a processor perform a method for storing file fragments of growing files in a flash-based storage system, the method comprising:
storing a first file fragment associated with a file in a journal area of a first log in flash memory, wherein a size of the file fragment is less than a physical NAND flash page size limit;
receiving a second file fragment associated with the file;
combining the first file fragment and the second file fragment when a combined size of the fragments is equal to the physical NAND flash page size limit;
storing the combined fragments in a main area of a second log in flash memory, wherein the second log is different from the first log;
receiving an update associated with the combined fragments; and
storing the update in an updates area of a third log in flash memory, wherein the third log is different from the first and second logs,
wherein each of the first, second and third logs comprises a respective journal area, a respective main area and a respective updates area.

14. The computer program product of claim 13, wherein a size of the update is less than the physical NAND flash page size limit.

15. The computer program product of claim 13, wherein the main area comprises content that is rarely updated, and the updates area and the journal area comprise content that is frequently updated.

16. The computer program product of claim 13, wherein the flash-based storage system comprises NAND flash.

17. The computer program product of claim 13, wherein the combined fragments are stored in pre-allocated NAND flash page of the main area.

18. The computer program product of claim 13, further comprising updating metadata information associated with the first, second, and third logs.

* * * * *